United States Patent [19]

Lenox

[11] 4,433,987
[45] Feb. 28, 1984

[54] AIR FILTRATION DEVICE

[76] Inventor: Arthur Lenox, 1390 Valley Rd., Stirling, N.J. 07980

[21] Appl. No.: 323,380

[22] Filed: Nov. 20, 1981

[51] Int. Cl.³ .............................................. B01D 50/00
[52] U.S. Cl. ...................... 55/319; 55/324; 55/328; 55/335; 55/341 R; 55/419
[58] Field of Search .................... 55/341 R, 319, 324, 55/328, 335, 350, 418, 419

[56] References Cited

U.S. PATENT DOCUMENTS

| | | | |
|---|---|---|---|
| 2,799,355 | 7/1957 | Easton | 55/286 |
| 3,479,146 | 11/1969 | Hochman et al. | 55/418 X |
| 3,480,330 | 11/1969 | Hirs et al. | 55/341 R |
| 3,739,557 | 6/1973 | Anderson et al. | 55/341 R |
| 3,749,130 | 7/1973 | Howitt et al. | 55/418 X |
| 3,803,814 | 4/1974 | Parsons, Jr. | 55/341 R |
| 3,963,467 | 6/1976 | Rolschau | 55/341 R |

*Primary Examiner*—Kathleen J. Prunner
*Attorney, Agent, or Firm*—Shlesinger, Arkwright, Garvey & Fado

[57] ABSTRACT

Apparatus for filtering air laden with dust or other particulate matter including: a filtering area, an air velocity dissipation zone above the filtering area, a lower tube sheet mounted above the dissipation zone and forming a partial boundary therewith, an air plenum mounted above the lower tube sheet, the air plenum including an air inlet for receiving dust laden air, an upper tube sheet forming an upper boundary of the air plenum, the lower tube sheet including a plurality of holes, the upper tube sheet including a plurality of holes vertically aligned with the holes in the lower tube sheet, a plurality of clean air outlet tubes having upper end, main body and lower end portions, the upper end portions being mounted within the holes in the upper tube sheet, the main body portions extending through the holes in the lower tube sheet, the lower end portions extending beneath the lower tube sheet and ending in a horizontal plane at the interface between the dissipation zone and the filtering area, a plurality of dust bags vertically positioned on the lower end portions of the outlet tubes and extending upwardly to the dissipation zone and positioned substantially within the filtering area, clamps for attaching the dust bags to the lower end portions of the outlet tubes, distributors in the lower tube sheet for initially dividing the dust laden air into a plurality of air streams and for initially directing the plurality of air streams in a generally horizontal path radially away from the lower end portions of the outlet tubes for effecting the air velocity dissipation zone, and a dust hopper positioned beneath the filtering area.

28 Claims, 22 Drawing Figures

AIR FILTRATION DEVICE

BACKGROUND OF THE INVENTION

Baghouses or bag filters, are devices used to collect dusts, light fly ash, lint and dust in general, as opposed to liquid particulates.

Baghouses typically include a dirty air inlet, a series of dust bags for entrapment of the particulate matter and a dust hopper located beneath the dust bags. Dust accumulates on the dust bags, and over a period of operating time, the dust bags become ineffective in filtering the incoming air. When this occurs, the dust bags must be periodically cleaned in order to remove entrained particulate matter therefrom.

In U.S Pat. No. 3,963,467 to Rolschau, a baghouse is described as having a bag chamber and a dirty air inlet at the top thereof whereby the dirty air is distributed to the upper surfaces of the filter bags. As the dirty air flows downwardly upon the bags, it passes through the bag wall and then travels upwardly in the bag exiting at the top of the collector device. Particulate matter collected at the bag surface is expelled in a back flush cycle whereby an air stream is passed through the interior of the bags causing the particulate matter to be discharged outwardly from the bag so that it subsequently combines with the downward flow of air and is finally passed into the hopper region.

Other types of dust separators are shown by Easton, U.S. Pat. No. 2,799,355; Hirs, et al U.S. Pat. No. 3,480,330; Parsons, Jr., U.S. Pat. No. 3,803,814; and Anderson, et al U.S. Pat. No. 3,739,557.

SUMMARY AND OBJECTS OF THE INVENTION

This invention relates to apparatus for filtering air laden with dust and other particulate matter, and more particularly to apparatus for distributing dust laden air along the entire length of the dust bags. The above is accomplished by means of a plurality of annular rings having circumferentially spaced air slots formed therein. These rings are each positioned within one of a number of holes contained in an air baffle mounted above the filtering area in order to cause an air velocity dissipation zone directly above the filtering bags. In view of this arrangement, a greater extent of the filtering bags is utilized thereby improving the filtering capacity of the system.

It is therefore an object of the present invention to provide an air filtering device having improved filtering capability.

It is another object of the present invention to provide an air filtering device having means for directing particulate matter to substantially the entire length of the air bags.

It is still another object of the present invention to provide an air filtering device including a plurality of annular rings having circumferentially spaced air slots for velocity dissipation of dust laden air entering the filtering area.

It is still another object of the present invention to provide an air filtering device wherein the annular rings are interchangeable.

It is still another object of the present invention to provide an air filtering device having improved means for dissipating air velocity above the dust bags so as to reduce damage to the dust bags as a result of high velocity air laden with particulate matter from directly impinging upon the surfaces thereof.

It still another object of the present invention to provide an air filtering device in which a plurality of dust bags are mounted upon outlet tubes extending into the filtering area and wherein means are provided for directing incoming air laden with dust onto the surfaces of adjacent outlet tubes so as to cause air velocity dissipation.

It is a further object of the present invention to provide an air filtering device which is more efficient and less costly to operate than previous devices.

The foregoing and other objects and advantages of this invention will appear from the following detailed description taken in conjunction with the accompanying drawings.

Figure 1:
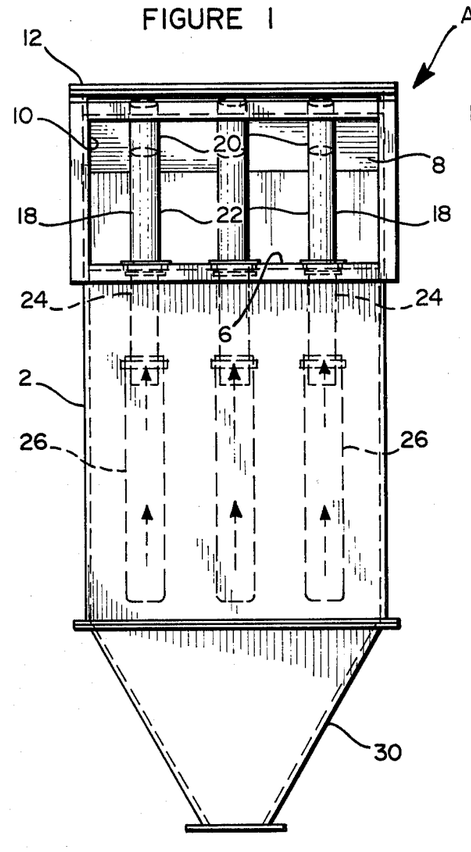
FIG. 1 is a front elevation view of the filtering apparatus.
Figure 2:
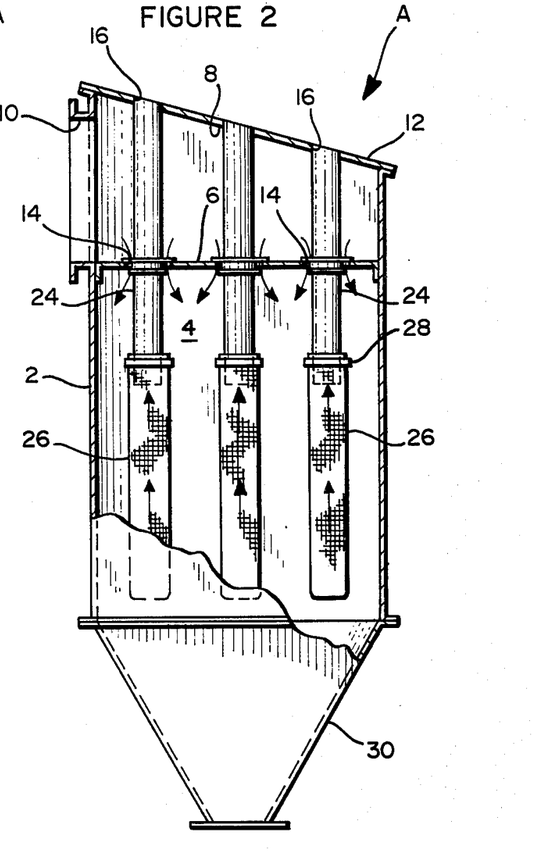
FIG. 2 is a right side elevational view portions in section and broken away for clarity.

FIGS. 1 AND 2

FIGS. 1 and 2 show a baghouse for an air filtering device A including filtering chamber 2 having an air velocity dissipation zone 4. A low tube sheet 6 is mounted above dissipation zone 4 and forms a boundary between air plenum 8 and filtering chamber 2. Included in air plenum 8 is an air inlet 10 for receiving dust laden air. Upper tube sheet 12 forms an upper boundary of air plenum 8. Lower tube sheet 6 includes a plurality of holes 14 while upper tube sheet 12 includes a plurality of air outlet holes 16 which are vertically aligned with holes 14. Clean air outlet tubes 18 are mounted within baghouse A and include upper end portions 20, main body portions 22 and lower end portions 24. Upper end portions 20 are mounted within holes 16 of upper tube sheet 12. Main body portions 22 extend through holes 14 in lower tube sheet 6. Lower end portions 24 extend beneath lower tube sheet 6 and end in a horizontal plane within filtering chamber 2. Dust bags 26 are attached by clamps 28 to lower end portions 24 and extend vertically a substantial distance within filtering chamber 2. Located below filtering chamber 2 is a dust hopper 30.

Figure 3:
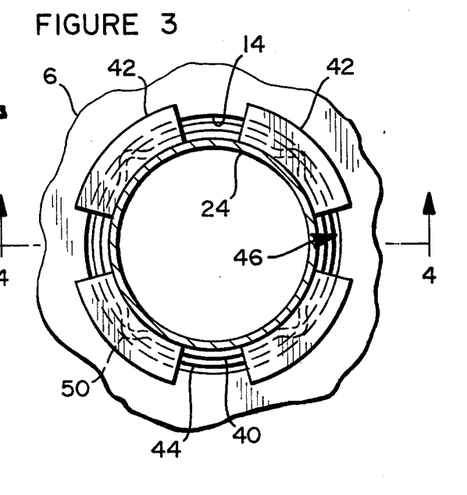
FIG. 3 is a fragmentary top plan view with parts shown in phantom lines and part in section.
Figure 4:
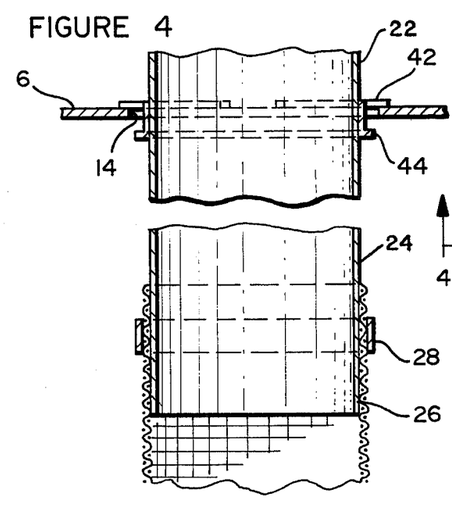
FIG. 4 is a cross sectional view taken on line 4—4 of FIG. 3, and viewed in the direction of the arrows.

FIGS. 3 AND 4

Positioned within holes 14 are annular rings 40 including upper flanges 42 which are circumferentially spaced around rings 40, and a lower annular flange 44. Annular rings 40 are positioned around lower end portions 24 of outlet tubes 18. Upper flanges 42 extend horizontally away from annular rings 40 and support annular rings 40 by resting upon lower tube sheet 6 and flanges 42 are preferably comprised of equal length arcuate segments. Lower annular flange 44 has an outside diameter less than that of holes 14 so as to provide a clearance 46 between lower annular flange 44 and the wall of hole 14 which facilitates the removal of annular rings 40 from outlet tubes 18.

Figure 5:
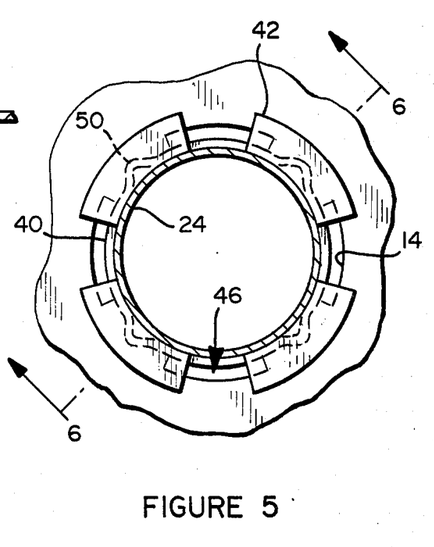
FIG. 5 is a fragmentary top plan view of an alternative embodiment of the annular ring with parts shown in phantom lines and in section.
Figure 6:
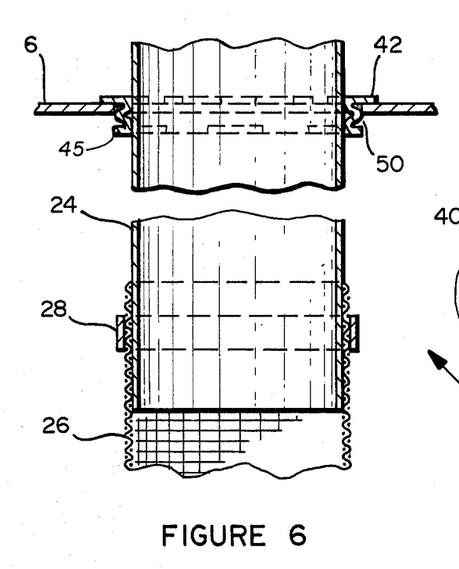
FIG. 6 is a cross sectional view taken on line 6—6 of FIG. 5, and viewed in the direction of the arrows.

FIGS. 5 AND 6

Annular rings 40 are also provided with projections or dimples 50 which extend upwardly and outwardly from annular rings 40 so as to reset against the edges of lower tube sheet 6. The annular ring 40 as shown in FIGS. 5 and 6 is identical to the annular ring as shown in FIGS. 3 and 4 with the exception the embodiment shown in FIGS. 5 and 6 does not include a lower annular flange 44, but a series of segments 45.

Figure 7:
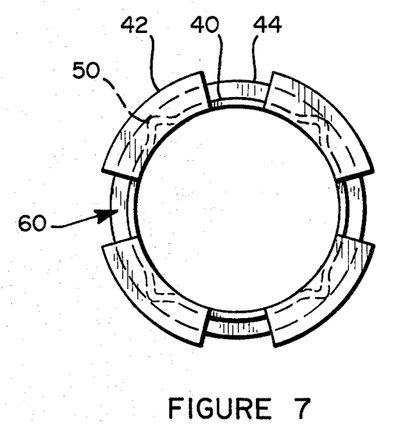
FIG. 7 is a top plan view of the annular ring as shown in FIG. 3.
Figure 8:
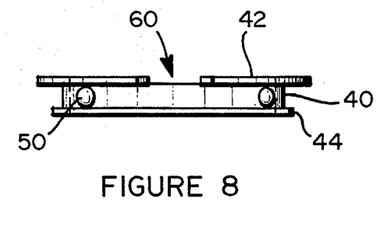
FIG. 8 is a side elevational view of the annular ring as shown in FIG. 7.

FIGS. 7 AND 8

FIGS. 7 and 8 show an annular ring 40 having upper flanges 42, lower annular flanges 44, and dimples 50. Between adjacent upper flanges 42 are air gaps 60, which allows air to flow therethrough generally radially. Air gaps 60 are, preferably, of equal arc lengths.

Figure 9:
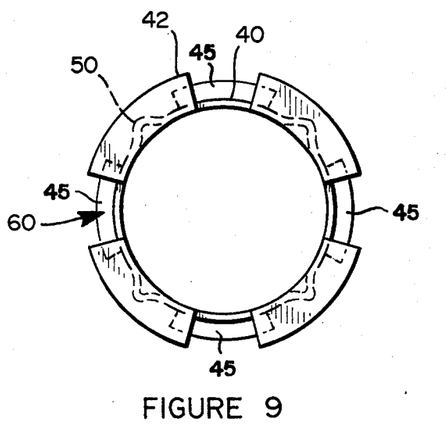
FIG. 9 is a top plan view of the annular ring as shown in FIG. 5.
Figure 10:
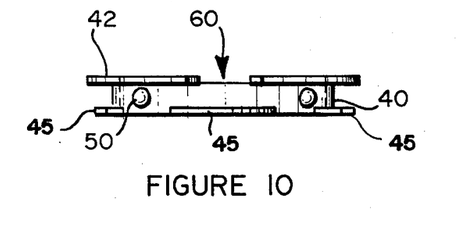
FIG. 10 is a side elevational view of the filter ring as shown in FIG. 9.

FIGS. 9 AND 10

As shown in FIGS. 9 and 10, annular rings 40 includes upper flanges 42, lower segmental flange 45 and dimples 50.

Figure 11:
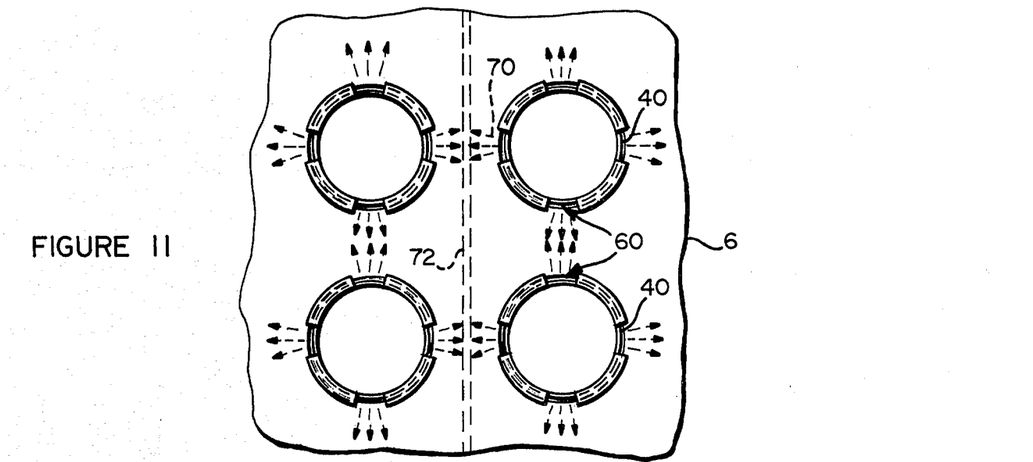
FIG. 11 is a fragmentary top plan view showing a plurality of annular rings with baffling means therebetween and air flow as shown by the arrows.
Figure 12:
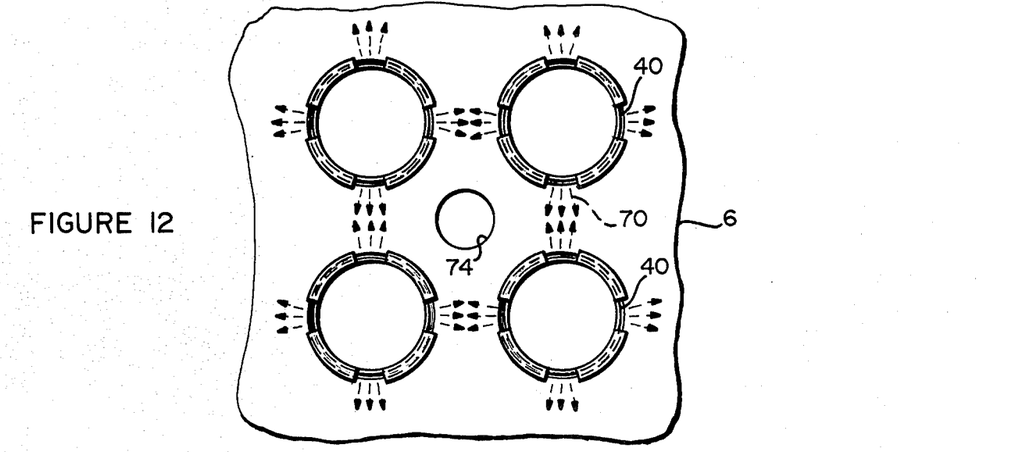
FIG. 12 is a fragmentary top plan view of an alternative embodiment of a plurality of annular rings having an auxiliary air inlet therebetween.
Figure 13:
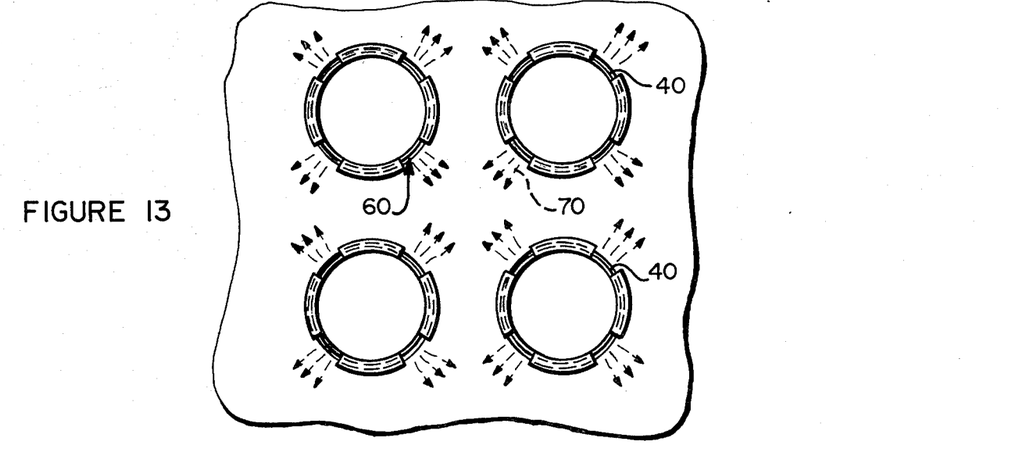
FIG. 13 is a fragmentary top plan view of an alternative embodiment of the annular rings having diagonal air flow between opposite rings as shown by the arrows.

FIGS. 11 THROUGH 13

In each of FIGS. 11 through 13 a plurality of annular rings 40 are mounted within lower tube sheet 6 in such a manner so as to align air gaps 60 in various predetermined positions. Thus positioned, the dynamic forces in each dust laden gas stream as shown by the arrows and indicated at 70, are dissipated as each gas stream 70 leaves air gaps 60 and impinge upon one another.

As shown in FIG. 11, an air baffle 72 may be attached to the base of lower tube sheet 6 between adjacent annular rings 40 in order to provide a fixed physical barrier for effecting air velocity dissipation of gas streams 70.

As shown in FIG. 12, an auxiliary air inlet 74 is provided in lower tube sheet 6 between a plurality of annular rings 40 in order to cause additional interaction and dissipation of gas streams 70 with air entering the filtering area through auxiliary air inlet 74.

Figures 14, 15:
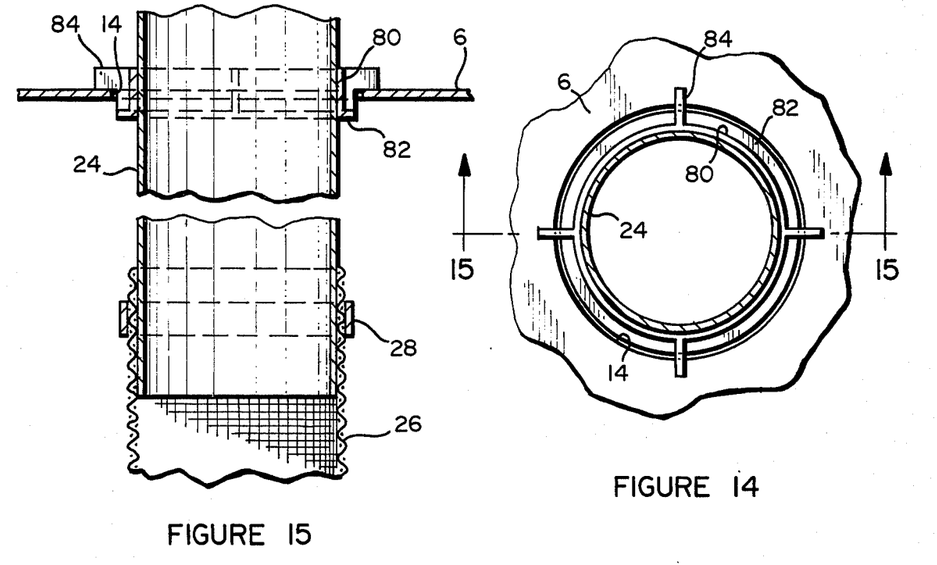
FIG. 14 is a fragmentary top plan view of an alternative embodiment of the invention.
FIG. 15 is a cross sectional view partially broken away to indicate indefinite length taken on line 15—15 of FIG. 14, and viewed in the direction of the arrows.

FIGS. 14 AND 15

FIGS. 14 and 15 show an alternative embodiment of the annular ring for directing high velocity air flow away from dust bags 26. In this embodiment, lower end portion 24 of outlet tube 18 is positioned within hole 14 of lower tube sheet 6. Annular ring 80 having annular flange 82 is positioned around the exterior of lower end portion 24 and is maintained within hole 14 by support arms 84 which extend outwardly from annular ring 80 and which rest upon lower tube sheet 6. Support arms 84 being relatively narrow in width offer little resistance to incoming air through hole 14. After passing through hole 14, the air stream is subsequently deflected in a generally horizontal path radially away from lower end portion 24 due to the presence of annular flange 82. The generally horizontally moving air stream will subsequently lose velocity as it subsequently strikes the surfaces of lower end portions 24 of adjacent outlet tubes 18 and other generally horizontal air streams. It is important that lower end portions 24 extend a sufficient distance beneath annular rings 80 so that dust bags 26 which are secured to the lower extremity of lower end portions 24 are not subject to damage due to direct impingement by air flow exiting from adjacent lower flange 82. In this manner, air passing through hole 14 is deflected outwardly and impinges upon lower end portions 24 of adjacent outlet tubes 18 but does not directly impinge upon dust bags 26 of adjacent outlet tubes 18 and the air streams tend to cancel each other prior to hitting an adjacent tube.

FIGS. 16 THROUGH 20

Figure 20:
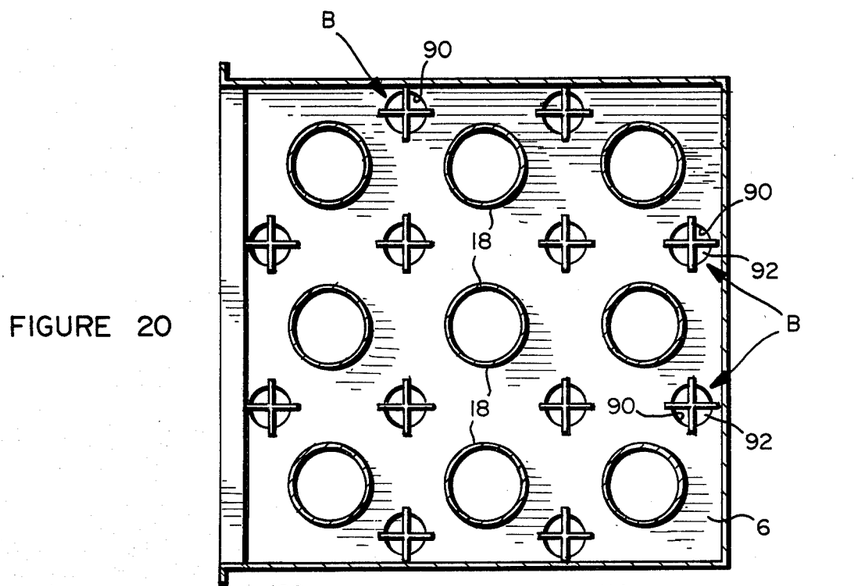
FIG. 20 is a top plan view showing a plurality of auxiliary air inlets with air dividers therein and a plurality of clean air outlet tubes between the auxiliary air inlets.

Referring now to FIG. 20, lower tube sheet 6 is provided with a plurality of outlet tubes 18 passing therethrough, and a plurality of auxiliary circular air inlets 90 within lower tube sheet 6. Outlet tubes 18 are shown to be positioned in parallel rows extending longitudinally and transversely on lower tube sheet 6. Inlets 90 are shown positioned in parallel rows extending longitudinally and transversely on lower tube sheet 6 between said longitudinal and transverse rows of outlet tubes 18. Mounted within and extending below air inlets 90 are air deflectors B. In the embodiment shown in FIGS. 16 and 17, each air deflector B includes a circular deflector plate 92 horizontally positioned below air inlet 90. Extending upwardly from deflector plate 92 are bisecting vertical walls 94 which section air deflector B into quadrants. Air deflector B is mounted within air inlet 90 by flanges 96 which extend outwardly from the top of vertical walls 94 beyond air inlet 90 so as to rest upon lower tube sheet 6.

Figure 16:
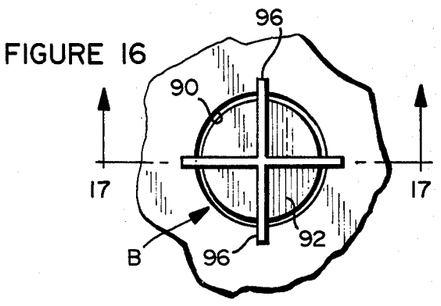
FIG. 16 is a fragmentary top plan view of an auxiliary air inlet with air divider therein.
Figure 17:
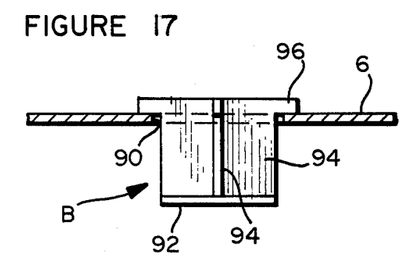
FIG. 17 is a cross sectional view taken on line 17—17 of FIG. 16, and viewed in the direction of the arrows.

Each air deflector B serves to direct air, which has passed through air inlet 90, outwardly in predetermined flow patterns. It is possible to position air deflectors B within air inlets 90 in such a manner so as to deflect the air stream outwardly onto the surface of lower end positions 24 of adjacent outlet tubes 18 thereby causing air velocity dissipation.

It is also possible to rotate air deflectors B within air inlets 90 so that any predetermined pattern of air flow may be achieved. It should also be noted that the diameter of deflector plate 92 is less than the diameter of air inlet 90 so that air deflector B may be removed for servicing and maintenance.

Figure 18:
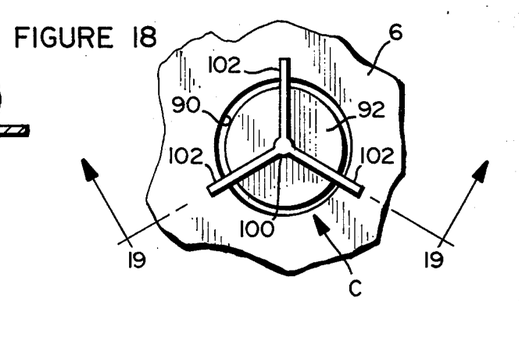
FIG. 18 is a fragmentary top plan view of an alternative embodiment of the auxiliary air inlet and divider.
Figure 19:
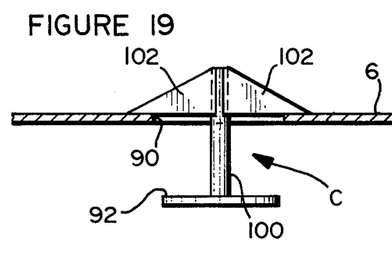
FIG. 19 is a cross sectional view taken on line 19—19 of FIG. 18, and viewed in the direction of the arrows.

In the embodiment as shown in FIGS. 18 and 19, each air deflector C includes a circular deflector plate 92 horizontally positioned beneath air inlets 90 and a shaft 100 extending vertically upward from the center of deflector plate 92. A plurality of support fins 102 extend outwardly from the upper portion of shaft 100 and rest upon lower tube sheet 6. This embodiment differs from that as shown in FIGS. 16 and 17 in that air passing through inlet 90 is not diverted into quadrants. Instead, air entering through inlet 90 is deflected from deflector plate 92 radially away from shaft 100 in a generally horizontal direction. Deflector plate 92 has a diameter less than that of air inlet 90 so as to permit removal of air deflector C for maintenance.

Figure 21:
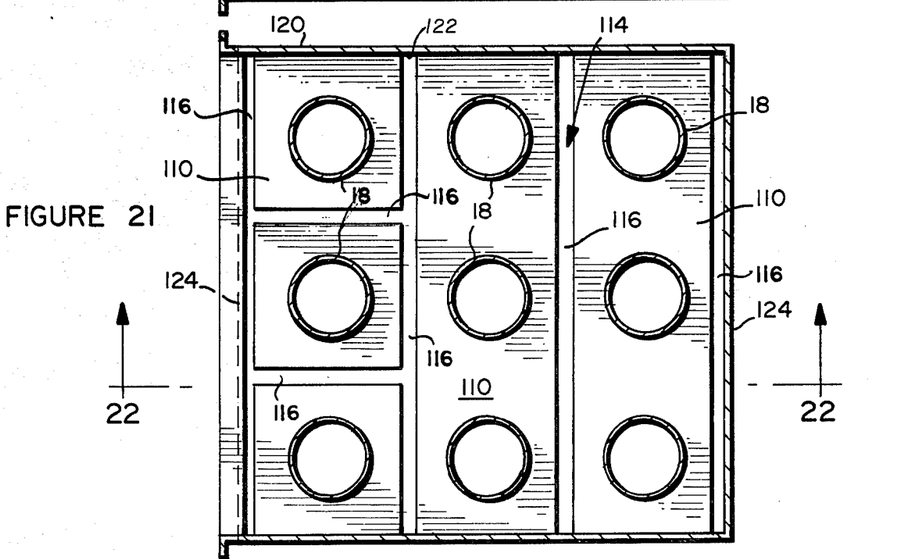
FIG. 21 is a top plan view of an alternative embodiment of the auxiliary air inlet.
Figure 22:
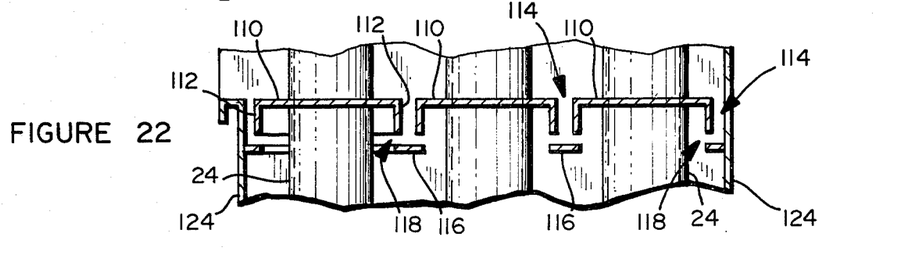
FIG. 22 is a fragmentary cross sectional view taken on line 22—22 of FIG. 21, and viewed in the direction of the arrows.

FIGS. 21 and 22

In the embodiment shown in FIGS. 21 and 22, the lower tube sheet is divided into a plurality of sections 110. The sections 110 may assume various configurations and extend in various directions. Side edges 112 of sections 110 are bent downwardly so that channeled slots 114 are formed. Deflector strips 116 having a width approximately the same as channeled slots 114, are positioned a small distance directly beneath channeled slots 114 running the length thereof, so as to form air gaps 118. Deflector strips 116 may be secured to vertical side walls 120 of the filtering apparatus by means of support welds 122. A plurality of outlet tubes 18 including lower end portions 24 pass through each of the sections 110.

Air entering the filtering apparatus and passing downwardly through channeled slots 114 will strike deflector strips 116 and subsequently be diverted in a horizontal path outwardly from air gaps 118. This outwardly flowing air stream will then encounter air velocity dissipation by striking the surfaces of lower end portions 24 of adjacent outlet tubes 18 or by striking one of the vertical walls 124, on adjacent opposing air streams.

OPERATION

Air laden with dust and other particulate matter enters air filtering device A through air inlet 10 and subsequently into air plenum 8. Next, the air passes through air slots 60 wherein it is divided into a plurality of individual streams. After the air has been channeled through air slots 60, it assumes a generally horizontal path below the lower tube sheet in a direction radially away from lower end portion 24 of outlet tubes 18. This generally horizontal flow is primarily due to deflection of the gas as it leaves the air slots 60. In addition, as best shown in FIG. 4, the inclusion of lower annular flange 44 is essential to the generally horizontal flow of gases leaving air slots 60.

As best shown in FIGS. 11 through 13, the velocity of the individual, generally horizontally directed gas streams 70, is dissipated so as to allow dust and other particulate matter to descend between dust bags 26 at a much lower velocity. The air velocity dissipation zone 4 extends generally from the base of lower tube sheet 6 downward to the top of dust bags 26. Upon leaving dissipation zone 4, the slowly moving air and dust are easily drawn to or forced towards each dust bag 26 starting at the uppermost portion thereof. In this manner, a greater percentage of each dust bag 26 is utilized in the filtering process. While dust bags 26 trap particulate matter, air passing through dust bags 26 travels upwardly through the outlet tubes 18 and finally exiting as clean air at the upper portion of air plenum 8.

Several arrangements of annular rings 40 within lower tube sheet 6 are shown in FIGS. 11 through 13. In FIGS. 11 and 12, air slots 60 of adjacent annular rings 40 oppose each other, so that gas streams 70 leaving air slots 60 impinge upon each other thereby causing an air-to-air type of dissipation. In addition, the velocity of gas streams 70 can also be dissipated by striking a fixed physical target such as lower end portion 24 of another outlet tube 18 or by striking a fixed air baffle 72 as is shown in FIG. 11.

In FIG. 13, air slots 60 of diagonally positioned annular rings 40 oppose each other so that gas streams 70 again encounter an air-to-air type of dissipation.

Depending upon the nature of the dirty air entering air filtering device A, any or all of the above mentioned air velocity dissipation arrangements may be utilized in order to achieve optimum results. Another important feature of the invention lies in the annular rings 40 being removable so as to be readily replaced. Substitute annular rings may be utilized in place of annular rings 40 in order to provide somewhat different air flow characteristics. For example, the length of the arc shaped upper flanges 42 may be increased or reduced in order to provide larger or smaller air slots 60. Furthermore, a greater or lesser number of upper flanges 42 may be utilized in conjunction with annular rings 40 so that the number of air slots 60 is likewise increased or decreased. Annular rings 40 may also be adjusted within holes 14 in order to adjust the position of air slots 60 with respect to one another.

Annular rings 40 are preferably made from metal and formed in one piece, however annular rings made from ceramics or other similar materials are also contemplated. Since the design of annular rings 40 is variable, interchanging one design of annular rings with another may be utilized in order to accomodate various operational parameters such as the type of entrained dust, the bag size, pressure drop and air volume needed for any given application.

Another important advantage of the annular ring design is a reduction in the amount of wear and damage to dust bags 26 due to the direct impingement of the air stream thereon. By effecting a dissipation zone above the bag area, the air which is to be filtered, strikes dust bags 26 with much less horizontal velocity than prior art devices.

The inclusion of dimples 50 provides an improved means for properly positioning and maintaining dust bags 26 vertically within filtering chamber 2.

The air velocity dissipation zone of the filtering apparatus extends generally from the base of lower tube sheet 6 down to the top of dust bags 26. In order to achieve maximum filtering capability, dust bags 26 must be positioned a sufficient distance below lower tube sheet 6. It is essential that the air streams entering the dissipation zone lose sufficient velocity before coming into contact with dust bags 26. By providing lower end portions 24 of outlet tubes 18 with sufficient length, the lessened velocity is achieved since dust bags 26 which are secured to the base of lower end portions 24 will be a sufficient distance below lower tube sheet 6 so that such air velocity dissipation will occur above dust bags 26.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What I claim is:

1. Apparatus for filtering air laden with dust or other particulate matter including:
   (a) a filtering area;
   (b) an air velocity dissipation zone above said filtering area;
   (c) a lower tube sheet mounted above said dissipation zone and forming a partial boundary therewith;
   (d) an air plenum mounted above said lower tube sheet;
   (e) said air plenum including an air inlet for receiving dust laden air;
   (f) an upper tube sheet forming an upper boundary of said air plenum;
   (g) said lower tube sheet including a plurality of holes;
   (h) said upper tube sheet including a plurality of holes vertically aligned with said holes in said lower tube sheet;
   (i) a plurality of clean air outlet tubes having upper end, main body and lower end portions;
   (j) said upper end portions being mounted within said holes in said upper tube sheet;
   (k) said main body portions extending through said holes in said lower tube sheet so as to define a clearance space between said portions and the peripheries of said holes;
   (l) said lower end portions extending a substantial distance beneath said lower tube sheet and ending in a horizontal plane at the interface between said dissipation zone and said filtering area;
   (m) a plurality of dust bags vertically positioned on said lower end portions of said outlet tubes and extending upwardly to said dissipation zone and positioned substantially within said filtering area;
   (n) means for attaching said dust bags to said lower end portions of said outlet tubes;
   (o) means associated with each of said holes in said lower tube sheet for initially dividing dust laden air flowing through the clearance space of each of said lower tube sheet holes into a plurality of air streams and for initially directing said plurality of air streams in a generally horizontal path radially away from said lower end portions of said outlet tubes;
   (p) said air velocity dissipation zone being disposed between said lower tube sheet and said dust bags;
   (q) a dust hopper positioned below said filtering area;
   (r) said means associated with said holes in said lower tube sheet for initially dividing said dust laden air including a plurality of annular rings; and,
   (s) each of said annular rings having a series of circumferentially spaced and outwardly extending upper flanges and a series of air slots between adjacent flanges.

2. Apparatus for filtering air laden with dust as in claim 1 and wherein:
   (a) said annular rings are positioned within said holes in said lower tube sheet and circumvent said outlet tubes.

3. Apparatus for filtering air laden with dust as in claim 2 and wherein:
   (a) said circumferentially spaced flanges having portions resting upon said lower tube sheet for positioning said outlet tubes within said holes in said lower sheet.

4. Apparatus for filtering air laden with dust as in claim 3 and wherein:
   (a) said annular rings having dimples for locating and positioning said annular rings centrally within said holes;
   (b) said dimples extending outwardly from said annular rings.

5. Apparatus for filtering air laden with dust as in claim 4 and wherein:
   (a) each of said annular rings having an annular lower flange.

6. Apparatus for filtering air laden with dust as in claim 5 and wherein:
   (a) said annular lower flange being substantially below said lower tube sheet.

7. Apparatus for filtering air laden with dust as in claim 1 and wherein:
   (a) said annular rings having means for centrally spacing said annular rings in said holes in said lower tube sheet to maintain said slots equally in radius.

8. Apparatus for filtering air laden with dust as in claim 1 and wherein:
   (a) said annular rings being positioned in said holes in parallel rows extending longitudinally and transversely on said lower tube sheet, and
   (b) said annular rings being rotatably adjustable in said holes whereby said air slots are adjustable relative to each other.

9. Apparatus for filtering air laden with dust as in claim 8 and wherein:
   (a) said air slots of adjacent annular rings oppose each other.

10. Apparatus for filtering air laden with dust as in claim 8 and wherein:
    (a) said air slots are diagonally positioned relative to said longitudinal and transverse rows.

11. Apparatus for filtering air laden with dust as in claim 10 and including:
    (a) an air baffle extending from said lower tube sheet and positioned between adjacent annular rings.

12. Apparatus for filtering air laden with dust as in claim 8 and including:
    (a) an auxiliary air inlet positioned in said lower tube sheet between a number of said annular rings.

13. Apparatus for filtering air laden with dust as in claim 8 and wherein:
    (a) each of said annular rings include four upper flanges and four air slots between said upper flanges.

14. Apparatus for filtering air laden with dust as in claim 8 and wherein:
    (a) said upper flanges having substantially equal arc lengths.

15. Apparatus for filtering air laden with dust as in claim 8 and wherein:
(a) said air slots have substantially equal arc lengths.

16. Apparatus for filtering air laden with dust as in claim 10 and wherein:
(a) said upper flanges having substantially equal arc length; and
(b) said air slots being arcuate shaped and having substantially equal arc length and said arc length of said air slots being substantially less than said arc length of said upper flanges.

17. Apparatus for filtering air laden with dust or other particulate matter as in claim 1 and wherein:
(a) said plurality of holes in said lower tube sheet are positioned in parallel rows extending longitudinally and transversely on said lower tube sheet;
(b) a plurality of auxiliary air holes in said lower tube sheet positioned in parallel rows extending longitudinally and transversely on said lower tube sheet between said longitudinal and transverse rows of holes;
(c) air stream diverting means adjustably mounted within said auxiliary air holes for diverting air outwardly in a generally horizontal path beneath said lower tube sheet;
(d) each said air diverting means including a circular plate positioned beneath each auxiliary air hole and lying in a horizontal plane intersecting said lower end portions of said outlet tubes a substantial distance above said dust bags, and
(e) said circular plate having a diameter less than that of each auxiliary air hole.

18. Apparatus for filtering air laden with dust or other particulate matter as in claim 17 and wherein each said air diverting means further includes:
(a) bisecting vertical plates and each of said plates having a top edge and a bottom edge;
(b) said bottom edges of said bisecting vertical plates being attached to said circular plate;
(c) said bisecting vertical plates extending upwardly through its associated auxiliary air hole;
(d) said top edges of said bisecting vertical plates extending outwardly beyond said auxiliary air hole and resting upon said lower tube sheet; and
(e) said circular plate and said bisecting vertical plates forming quadrants below said auxiliary air hole for redirecting high velocity air passing downwardly through said auxiliary air holes outwardly in generally horizontal paths below said lower tube sheet and against said lower end portions of adjacent outlet tubes.

19. Apparatus for filtering air laden with dust or other particulate matter as in claim 18 and wherein:
(a) said quadrants oppose said lower end portions of adjacent outlet tubes.

20. Apparatus for filtering air laden with dust or other particulate matter as in claim 17 and wherein each of said air diverting means further includes:
(a) a vertical shaft having an upper end portion and a lower end portion;
(b) said shaft attached to the center of said circular plate at said lower end portion and passing upwardly through its associated auxiliary air hole;
(c) a plurality of mounting fins extending outwardly from said upper end portion of said vertical shaft beyond said auxiliary air hole and resting upon said lower tube sheet; and
(d) said circular plate redirecting high velocity air passing downwardly through said auxiliary air hole and impinging thereupon in a generally horizontal path radially away from said shaft and against said lower end portions of adjacent outlet tubes.

21. Apparatus for filtering air laden with dust or other particulate matter as in claim 1 and wherein:
(a) said lower tube sheet comprises a plurality of spaced individual sections positioned in side-by-side relation;
(b) said sections including down-turned edges;
(c) said down-turned edges of adjacent sections forming elongated channeled slots;
(d) deflector strips positioned beneath said channeled slots and running the length thereof;
(e) said deflector strips having a width substantially the same as said channeled slots;
(f) air gaps between said down-turned edges and said deflector strips;
(g) said deflector strips lying in a horizontal plane intersecting said lower end portions of said outlet tubes at a distance substantially above said dust bags; and
(h) said deflector strips causing high velocity air entering through said channeled slots to be deflected outwardly through said air gaps in a generally horizontal path against said lower end portions of adjacent outlet tubes thereby effecting air velocity dissipation.

22. In an apparatus for filtering air laden with dust or other particulate matter comprising a filtering area, an air velocity dissipation zone above said filtering area, a lower tube sheet above said dissipation zone, and air plenum, said lower tube sheet forming a lower boundary of said air plenum, an upper tube sheet forming an upper boundary of said air plenum, a plurality of outlet tubes associated with said upper tube sheet, said outlet tubes extending from said upper tube sheet to said filtering area, a plurality of dust bags in said filtering area and associated with said outlet tubes, a plurality of openings in said lower tube sheet associated with said dust bags and through which said outlet tubes extend, a dust hopper positioned beneath said filtering area, and an air diverting means within said openings, the improvement comprising:
(a) said air diverting means are annular rings and each of said rings having circumferentially spaced upper flanges,
(b) air slots between said flanges, and
(c) wherein said annular rings are mounted within said openings and circumvent said outlet tubes so that said dust laden air in passing through said slots is initially divided into a plurality of air streams traveling in a generally horizontal path radially away from said openings for effecting air velocity dissipation.

23. Apparatus for filtering air laden with dust or other particulate matter including:
(a) a filtering area;
(b) an air velocity dissipation zone above said filtering area;
(c) a lower tube sheet mounted above said dissipation zone and forming a partial boundary therewith;
(d) an air plenum mounted above said lower tube sheet;
(e) said air plenum including an air inlet for receiving dust laden air;

(f) an upper tube sheet forming an upper boundary of said air plenum;

(g) said lower tube sheet including a plurality of holes;

(h) said upper tube sheet including a plurality of holes vertically aligned with said holes in said lower tube sheet;

(i) a plurality of clean air outlet tubes having upper end, main body and lower end portions;

(j) said upper end portions being mounted within said holes in said upper tube sheet;

(k) said main body portions extending through said holes in said lower tube sheet;

(l) said lower end portions extending beneath said lower tube sheet and ending in a horizontal plane at the interface between said dissipation zone and said filtering area;

(m) a plurality of dust bags vertically positioned on said lower end portions of said outlet tubes and extending upwardly to said dissipation zone and positioned substantially within said filtering area;

(n) means for attaching said dust bags to said lower end portions of said clean air outlet tubes;

(o) a plurality of openings in said lower tube sheet for directing air flow from said plenum downwardly below said lower tube sheet; and (p) diverting means associated with said openings for diverting substantially the entire downward air flow outwardly in a generally horizontal path below said lower tube sheet and against said lower end portion of said outlet tubes; and (q) said lower end portions of said outlet tubes extending a substantial distance below said diverting means so that substantially the entire air flow passing outwardly from said diverting means will strike said lower end portions of adjacent outlet tubes above their respective dust bags and thereby prevent high velocity air from impinging upon said dust bags to reduce damage thereto.

24. Apparatus for filtering air laden with dust or other particulate matter as in claim 23 and wherein:

(a) said lower tube sheet includes a plurality of individual sections positioned in side-by-side relation;

(b) said sections including down-turned edges;

(c) said down-turned edges of adjacent sections being spaced from one another and forming elongated channeled slots;

(d) deflector strips positioned beneath said channeled slots and running the length thereof;

(e) air gaps between said downturned edges and said deflector strips;

(f) said deflector strips lying in a horizontal plane intersecting said lower end portions of said outlet tubes at a distance substantially above said dust bags; and (g) said deflector strips causing air passing downwardly through said channeled slots to be deflected outwardly through said air gaps in a generally horizontal path against said lower end portions of adjacent outlet tubes thereby effecting air velocity dissipation.

25. Apparatus for filtering air laden with dust or other particulate matter as in claim 23 and wherein:

(a) said openings in said lower tube sheet are circular holes;

(b) each of said air diverting means includes:

(i) a circular plate positioned beneath an associated circular hole and lying in a horizontal plane intersecting said lower portions of said outlet tubes at a substantial distance above said dust bags;

(ii) bisecting vertical plates and each of said vertical plates having a top edge and a bottom edge;

(iii) said bottom edge of each of said vertical plates attached to said circular plate;

(iv) said bisecting vertical plates extending upwardly through said circular hole;

(v) said top edges of said vertical plates extending outwardly at a distance beyond said circular hole and resting above said lower tube sheet;

(vi) said circular plate and said bisecting vertical plates forming quadrants for redirecting air pressure downwardly through said circular hole and outwardly against said lower end portions of adjacent outlet tubes; and, (vii) said circular plate having a diameter less than the diameter of said circular hole.

26. Apparatus for filtering air laden with dust or other particulate matter as in claim 25 and wherein:

(a) said outlet tubes are positioned in parallel rows extending longitudinally and transversely in said lower tube sheet;

(b) said circular holes are positioned in parallel rows extending longitudinally and transversely on said lower tube sheet between said longitudinal and said transverse rows of said outlet tubes; and (c) said quadrants oppose said lower end portions of adjacent outlet tubes.

27. Apparatus for filtering air laden with dust or other particulate matter as in claim 23 and wherein:

(a) said air openings in said lower tube sheet are circular holes;

(b) each of said air diverting means includes:

(i) a circular plate positioned beneath an associated circular hole and lying in a horizontal plane intersecting said lower portions of said outlet tubes at a substantial distance above said dust bags;

(ii) a vertical shaft having an upper end portion and a lower end portion;

(iii) said shaft attached to the outer periphery of said circular plate at said lower end portion and passing upwardly through said circular hole;

(iv) a plurality of mounting fins attached to said upper portion of said shaft and extending outwardly beyond said circular hole and resting upon said lower tube sheet;

(v) said circular plate redirecting air passing downwardly through said circular hole and outwardly against said lower end portions of adjacent outlet tubes; and, (vi) said circular plate having a diameter less than the diameter of said circular hole.

28. Apparatus for filtering air laden with dust or other particulate matter as in claim 27 and wherein:

(a) said outlet tubes are positioned in parallel rows extending longitudinally and transversely in said lower tube sheet; and (b) said circular holes are positioned in parallel rows extending longitudinally and transversely on said lower tube sheet between said longitudinal and said transverse rows of said outlet tubes.

* * * * *